(12) United States Patent
Furuhaug et al.

(10) Patent No.: US 10,677,945 B2
(45) Date of Patent: Jun. 9, 2020

(54) HYDROPHONE HOUSING

(71) Applicant: Optoplan AS, Tiller (NO)

(72) Inventors: Roar Furuhaug, Trondheim (NO); Jon Thomas Kringlebotn, Trondheim (NO)

(73) Assignee: OPTOPLAN AS, Tiller (NO)

( * ) Notice: Subject to any disclaimer, the term of this patent is extended or adjusted under 35 U.S.C. 154(b) by 1165 days.

(21) Appl. No.: 14/402,876

(22) PCT Filed: May 24, 2013

(86) PCT No.: PCT/EP2013/060802
§ 371 (c)(1),
(2) Date: Nov. 21, 2014

(87) PCT Pub. No.: WO2013/175010
PCT Pub. Date: Nov. 28, 2013

(65) Prior Publication Data
US 2015/0085618 A1    Mar. 26, 2015

(30) Foreign Application Priority Data

May 24, 2012   (EP) ..................................... 12169288

(51) Int. Cl.
*G01V 1/00*    (2006.01)
*G01V 1/18*    (2006.01)
*G01H 9/00*    (2006.01)

(52) U.S. Cl.
CPC .............. *G01V 1/188* (2013.01); *G01V 1/186* (2013.01); *G01H 9/004* (2013.01); *G01V 1/189* (2013.01); *G01V 2210/1427* (2013.01)

(58) Field of Classification Search
USPC ....................................................... 367/172
See application file for complete search history.

(56) References Cited

U.S. PATENT DOCUMENTS 3,263,208 A    7/1966  Douglas et al.
3,471,827 A    10/1969 Chelminski et al.
(Continued)

FOREIGN PATENT DOCUMENTS

EP    1015854    7/2000

OTHER PUBLICATIONS

Written Opinion of the International Search Authority: for PCT/EP2013/060802.*
(Continued)

*Primary Examiner* — James R Hulka
(74) *Attorney, Agent, or Firm* — Tong, Rea, Bentley & Kim LLC

(57) ABSTRACT

The invention relates to a hydrophone housing. The housing comprises an outer casing with an exterior shape being in close contact with sediment when buried therein and having a deflectable wall part. Solid material partly fills the casing to define an outer chamber behind the deflectable wall part, a cavity shaped so that an inner chamber is defined immediately surrounding a hydrophone sensing element held therein, and a first duct for liquid flow communication between the outer chamber and the cavity or an internal volume of the hydrophone sensing element. Thereby, a hydraulic coupling is provided so that an acoustic pressure causing small radial displacements of outer surface of the housing will, via liquid in the first duct, cause large radial displacements of the hydrophone sensitive element. The area of the deflectable wall part is much larger than the area of the sensitive element so that only small displacements of the housing are required to cause large displacements at the hydrophone sensing element.

13 Claims, 8 Drawing Sheets

(56) References Cited

U.S. PATENT DOCUMENTS

| | | | |
|---|---|---|---|
| 4,074,224 A | 2/1978 | Laurent | |
| 4,114,723 A * | 9/1978 | Paitson | G01V 1/137 |
| | | | 181/119 |
| 4,458,343 A | 7/1984 | Tehon et al. | |
| 4,568,408 A | 2/1986 | Schmadel | |
| 5,137,109 A * | 8/1992 | Dorel | G01V 11/005 |
| | | | 181/106 |
| 5,363,342 A | 11/1994 | Layton et al. | |
| 5,550,785 A * | 8/1996 | Laurent | G01V 1/52 |
| | | | 181/102 |
| 6,122,225 A | 9/2000 | Cheng et al. | |
| 6,418,792 B1 | 7/2002 | Spychalski | |
| 6,549,488 B2 * | 4/2003 | Maas | G01H 9/00 |
| | | | 367/149 |
| 6,584,038 B2 | 6/2003 | Meunier | |
| 6,879,546 B2 * | 4/2005 | Halvorsen | G01V 1/201 |
| | | | 367/166 |
| 6,882,595 B2 * | 4/2005 | Woo | H04R 1/44 |
| | | | 367/149 |
| 7,295,493 B1 | 11/2007 | Ames | |
| 7,369,716 B2 * | 5/2008 | Berg | G01V 11/00 |
| | | | 385/12 |
| 7,551,517 B2 * | 6/2009 | Berg | G01V 1/16 |
| | | | 367/149 |
| 2002/0159331 A1 * | 10/2002 | Meunier | G01V 1/16 |
| | | | 367/15 |
| 2003/0035344 A1 | 2/2003 | Mass et al. | |
| 2004/0017731 A1 | 1/2004 | Halvorsen et al. | |
| 2004/0184352 A1 | 9/2004 | Woo | |
| 2004/0202401 A1 | 10/2004 | Berg et al. | |
| 2007/0258330 A1 | 11/2007 | Berg et al. | |

OTHER PUBLICATIONS

EP Search Report mailed in corresponding EP Patent Application No. 13 726 715.9, dated Nov. 8, 2018, 10 pages.

\* cited by examiner

HYDROPHONE HOUSING

CROSS-REFERENCE TO RELATED APPLICATIONS

This application is a National Phase Application of PCT International Application No. PCT/EP2013/060802, entitled "HYDROPHONE HOUSING", International Filing Date May 24, 2013, published as WO 2013/175010, which in turn claims priority from European Union Application No. 12169288.3, filed May, 24, 2012, all of which are incorporated herein by reference in their entirety.

FIELD OF THE INVENTION

The present invention relates to a housing for a hydrophone sensing element, in particular for a hydrophone sensing element to be buried in sediment.

BACKGROUND OF THE INVENTION

A hydrophone generally involves the following elements: a hydrophone sensing element for generating a signal when subject to pressure changes connected to means for acquiring or transmitting the signal, including a support structure for holding these and optionally shielding for protection of the hydrophone sensing element.

FIG. 1 is a schematic illustration of a hydrophone sensing element, here a fibre-optic air-backed mandrel hydrophone 1. The support structure is here provided by mandrel 2 around which an optic fibre 3 is coiled. The sensitive part of the hydrophone sensing element is here the surface part 4 which is typically cylindrical. The mandrel is mounted on an inner tube 6 to form an air or gas filled cavity in between to make the sensitive element air-backed. Fibre ends 5 provide the means for transmitting the generated signal.

Typical hydrophones are designed to operate in liquid, where one wants the water pressure to induce a large compression of the hydrophone sensing element to provide high sensitivity. In practical use, such hydrophones are shielded or encapsulated for protecting the sensing elements during handling, but care is taken to maintain their sensitivity and dynamic range.

For permanent ocean bottom seismic systems (OBS), hydrophones are typically trenched or buried under the seabed for protection and optimized mechanical coupling to the formations. This imposes a number of challenges. The upper parts of the seabed wherein hydrophones are buried consist of sediments. In the present description, sediment is as a mixture of solid particles and liquid, in the present context typically a mix of sand, silt, or clay and water. Firstly, sediments have, as opposed to water, a finite shear (elastic) stiffness. When the hydrophone is buried in materials with significant shear stiffness, pressure changes to be measured will in addition to cause strain in the sensing element, also cause elastic stress in the surrounding sediments close to the sensing element. These elastic stresses will restrict deflection of the surrounding sediments, and thus potentially reduce the resulting strain in the sensing element, i.e. cause loss in the acoustic pressure energy transfer. The prior art hydrophones are therefore disadvantageous for sensing pressure changes in materials of uncertain or varying shear stiffness. Since the properties of sediments may vary over time as well as with location, the pressure transfer to buried hydrophones, and thus the measured signals, becomes incomparable. Secondly, the hydrophone is subject to a rough handling during burying leading to the need for a stronger protection than required for hydrophones used in water.

U.S. Pat. No. 6,584,038 discloses a hydrophone housing for a solid environment for seismic monitoring of hydrocarbon or gas reservoirs. Here, a hydrophone is immersed in a closed flexible-walled housing filled with liquid and closed by a seal having a duct for a cable connecting the hydrophone to a signal acquisition means. The housing is arranged to be tightly coupled with a solid medium substantially over the total surface thereof, preferably by means of a hardenable material such as cement. There is no mentioning of control of pressure transfer efficiency and hydrophone sensitivity in the patent.

Hence, an improved hydrophone housing with a controlled and stable pressure transfer when operating in sediments, giving a maximum hydrophone sensitivity would be advantageous.

SUMMARY OF THE INVENTION

It is an object of the present invention to provide a hydrophone housing, and a hydrophone assembly comprising such housing, suitable for operating in sediments.

It is another object to provide a hydrophone housing and an assembly optimized for low loss transfer of pressure energy from the surroundings to the hydrophone sensing elements when buried in sediments by minimising the stresses in the surrounding sediments and at the same time maximise the strain in the sensing element to maximise the hydrophone signal to noise ratio.

Keeping stresses in surrounding sediment low to effectively transfer pressure energy to the sensing element and at the same time maximizing strain in the sensing element to obtain a better signal to noise ratio leads to two countering demands:
1. Maximizing strain in sensing element for better reading
2. Minimizing strain in sensing element to minimize stresses in surrounding material The basic idea of the invention is to provide a hydraulic amplifier that collects pressure energy on a large surface in contact with the surrounding material and transmits it to the hydrophone sensing element by a fluid with no significant shear stiffness. This hydraulic amplifier is provided in a housing for the hydrophone sensing element. Thereby, the hydrophone sensing element is not in direct contact with the surrounding material and demand 2 above turns into minimizing strain in the outer surface of the housing to minimize stresses in surrounding material.

Thus, the above described objects and several other objects are intended to be obtained in a first aspect of the invention by providing a hydrophone housing according to claims 1 or 2.

In a second aspect, the invention provides a hydrophone housing assembly comprising a hydrophone housing according to the first aspect and a hydrophone sensing element held in the cavity of the housing.

In the following, a number of further aspects, preferred and/or optional features, elements, examples and implementations will be described. Features or elements described in relation to one embodiment or aspect may be combined with or applied to the other embodiments or aspects where applicable. For example, structural and functional features applied in relation to the hydrophone housing may also be used as features in relation to the other aspects and vice versa. Also, explanations of underlying mechanisms of the invention as realized by the inventor are presented for explanatory purposes, and should not be used in ex post facto analysis for deducing the invention.

In the present description, the hydrophone sensing element comprises the part of the hydrophone, typically a surface part, which is pressure sensing, such as pressure compliant, acoustically sensing, or displacement sensing.

The deflectable wall part of the casing is part of the casing which is compliant to pressure changes in that it is made sufficiently thin to be able to flex under the influence of an external acoustic pressure to minimize loss in pressure energy to maximise the pressure transfer and overall hydrophone sensitivity, yet thick enough to withstand being buried in sediment and the handing during the burying. A suitable thickness depends on a number of design parameters such as material, size and required sensitivity.

In the hydrophone housing according to the invention, the deflectable wall part of the casing provides a large sensing surface in contact with the surroundings that picks up pressure variations as very small radial deflections. The interior of the casing provides a hydraulic system where an external (acoustic) pressure causing a small radial displacement of the larger area of the deflectable wall part ($A_1$, wall of the outer chamber provided by this) will, via the liquid in the first duct, cause a large radial displacement of the smaller area of the sensitive element ($A_2$, wall of the inner chamber provided by the sensitive element), please also refer to FIG. 4 for illustration. This hydraulic coupling, "external pumping", between the deflectable wall part and the hydrophone sensitive element (i.e. between the outer and inner chambers) has the effect that only small radial displacement (compression) of the housing is required to obtain a large displacement at the hydrophone sensing element. Thus, e.g., only small strain/stresses in the surrounding sediments will be required to provide the needed strain of the sensitive element, ensuring small pressure energy transfer loss due to elastic deformation of the sediments.

In an alternative hydrophone housing according to the invention, the outer chamber is hydraulically coupled to an internal volume of the hydrophone sensing element via the first duct. In this way, the inner chamber surrounding the hydrophone sensing element acts as a backing volume for the hydrophone sensing element. It is known in the art that using a liquid filled volume as the backing volume will reduce the compliance of a hydrophone sensing element and thus the sensitivity. However, by using this configuration, hereinafter referred to as "internal pumping", where the acoustic pressure variations sensed by the deflectable wall are transmitted to the internal volume of the hydrophone sensing element, the liquid filled volume, i.e. the inner chamber, may be made relatively large, thus increasing the compliance of the backing volume and thus the sensitivity.

In embodiments of the abovementioned alternative hydrophone housings, the exterior shape is suitable for being in close contact with sediment when buried therein.

In embodiments of the hydrophone housings of the invention, the compliance of the liquid backing volume may be further increased by introducing a compliance-enhancing element, such as a gas-filled bellows in the backing volume. In embodiments using external pumping, the bellows is thus introduced into the inner volume of the hydrophone sensing element. Analogously, in embodiments using internal pumping, the bellows is introduced into the inner chamber, i.e. just outside the hydrophone sensing element.

It is preferred that the strain at the deflectable wall part be significantly smaller, such as much smaller, than the strain at the hydrophone sensing element. In other words, it is preferred that $dR/R \ll dr/r$, where R is the radius of the casing (the deflectable wall part) and r is the radius of the sensitive element of the hydrophone. This is obtained for $A_1 \gg A_2$, where $A_1 = 2\pi R L_1$ and $A_2 = 2\pi r L_2$, since we with an approximation of an incompressible transmission fluid have that:

$$A_2\, dr = A_1\, dR,$$

where $L_2$ is the length of the wall of the inner chamber provided by the sensitive element, and $L_1$ is the length of the deflectable wall part of the casing.

Further, the casing of the housing should be in best possible direct contact with the surrounding sediments, meaning that the sediments should pack closely around the casing, in particular around the deflectable wall part.

The hydrophone housing according to the invention provides an exterior shape suitable for being in close contact with sediment when buried therein. That means that it is formed so that sediment will automatically fill and pack closely around the exterior surface of at least the deflectable wall parts. In a preferred embodiment, this is obtained by an exterior surface, of at least the deflectable wall parts, which is continuous and overall flat or convex. In a preferred embodiment, the exterior shape of the housing, or equivalently of the casing, has an overall cylindrical exterior shape with the deflectable wall parts being arranged in a central band thereof.

Thus, the invention is particularly, but not exclusively, advantageous for requiring only small displacement amplitudes of the housing to obtain a high sensitivity at the hydrophone sensing element and for having an exterior surface being in close contact with sediment when buried therein.

The deflectable wall part area is preferably the total outer surface area of the housing to maximise the contact area with the surrounding sediments, but practical considerations may limit the area of the deflectable wall, for example to a cylindrical part as illustrated in the figures. The deflectable wall should ideally be much stiffer than the surrounding sediments to reduce the stresses in the surrounding sediments. In a preferred embodiment the deflectable wall may be formed in stainless steel and typically have a thickness of 1 to 10 mm. The diameter of the sensitive element may for example be 25 mm with a length of 30 mm. The outer diameter of the housing will typically be less than 100 mm, e.g. 60 mm, with a length of e.g. 100 mm.

The first duct that connects the outer and inner chambers preferably has small transverse dimensions (i.e. "narrow") in order to reduce the overall volume of liquid in the housing to increase the stiffness of the hydraulic transmission system. Furthermore, the transverse and longitudinal dimensions of the duct can be chosen to provide a frequency dependent transmission with a cut-off for higher acoustic frequencies. Hence, the duct can be dimensioned to act as a mechanical, acoustic low-pass filter in the form of a Helmholtz tube or filter. In this way, the duct may be dimensioned to have an acoustic cut-off frequency above the acoustic frequency interval of interest, such as above 200 Hz. The 3 dB cut-off frequency of the mechanical low pass filter is approximately (neglecting the inductive contribution to the flow resistance due to the mass of the liquid, which is valid for the example below):

$$f_c = \frac{N}{2\pi RC},$$

where N is the number of ducts connecting the outer and inner chambers, R is the flow resistance through one duct, and C is the combined compressibility of the liquid (increasing with volume) and hydrophone sensing element inside the inner chamber. Provided that the duct is dimensioned so that $L_{duct} \gg R_{duct}$, where $R_{duct}$ is the radius and $L_{duct}$ is the length of the duct, the compressibility can be expressed as:

$$R = \frac{8 d v L_{duct}}{\pi R_{duct}^4},$$

where d and v is the density and viscosity of the liquid (e.g. silicone oil with $d=970$ kg/m$^3$, $v=1.5 \cdot 10^{-3}$ m$^2$/s at 5° C.). For e.g. N=1, C=2.2 μL/bar, $L_{duct}$=5 mm and $R_{duct}$=0.85 mm, one gets a cut-off frequency $f_c$=204 Hz.

Preferably, the housing involves one or more first ducts arranged radially between the outer chamber and the inner chamber/central cavity.

The interior of the housing may be "DC" pressure balanced with the surroundings. This may be provided through a narrow second duct which will equalize or balance static (DC) pressures between the interior and the surroundings, but which will not pass the acoustic (AC) pressure (typically frequencies >1 Hz). As for the first duct above, the second duct may be dimensioned to act as a mechanical, acoustic low-pass filter in the form of a Helmholtz tube or filter, but with a much lower cut-off frequency such as 1 Hz, 0.5 Hz, or 0.1 Hz. Tuning of the cut-off frequency for the second duct is similar to as described for the first duct above. Applicable dimensions may e.g. a length of 100 mm with a diameter of 0.3 mm.

The second duct may lead into a distensible equalizing chamber to be able to compensate for changes in liquid volume with changes in temperature, e.g. during installation. Hence, the housing may comprise a liquid filled equalizing chamber, preferably provided by a bladder or an elastic membrane, positioned outside the casing and being in liquid connection with the interior of the casing via the second duct.

Analogously to the pressure balancing of the housing as described above, the internal volume of the hydrophone sensing element may also be liquid-filled and DC pressure balanced. This is an advantage for applications under large hydrostatic pressures, i.e. deep water. By pressure balancing the hydrophone sensing element, the sensitive part may be made thinner as it does not need to be dimensioned to withstand a large pressure difference. Thus, the compliance of the sensitive part may be significantly increased, hence increasing the sensitivity, while still allowing for use in deep water. A further advantage of pressure balancing the hydrophone sensing element is that the absolute strain in the element may be reduced. In a fibre-optic mandrel hydrophone sensing element, this reduces the requirement on fibre strain when spooling the fibre onto the mandrel, thus improving the reliability of the device. Pressure balancing of the hydrophone sensing element may be achieved by connecting the internal volume of the hydrophone sensing element with the inner chamber via an internal equalizing duct. The internal equalizing duct must be dimensioned so that only low frequency pressure variations may pass the duct. Thus, similar design objectives apply to the internal equalizing duct as to the second duct.

In an embodiment of the invention, the hydrophone housing further comprises an accelerometer chamber adapted for housing at least a first accelerometer, such as three accelerometers. In this way, the hydrophone housing may act as a complete sensor station, e.g. in a 4-component (4C) sensor system, comprising x-,y-,z-accelerometer and the hydrophone sensing element. For a discussion on different configurations of such 4C sensor stations, please refer to U.S. Pat. No. 7,551,517 by the same application, which is hereby incorporated by reference for the purpose of describing sensor station layouts. The accelerometer chamber may be in fluid communication with the inner chamber, the outer chamber or the first duct via a connection duct. Thus, the accelerometer chamber is preferably DC balanced with the inner and outer chambers, and optionally with the distensible equalizing chamber, but does not receive the acoustic pressure variances from the outer chamber. In this way, a particularly efficient and integrated sensor station may be achieved, which is fully pressure balanced and thus alleviates the need for pressure sealings. Furthermore, the sensors of the sensor station may be formed by a continuous length of optical fibre, due to the reduced requirements on strain tolerance and pressure sealing.

In an embodiment, the connection duct is the second duct.

In principle, the housing can be applied with any type of hydrophone sensing element within the size- and shape limitations set by the housing itself. The cavity in the interior of the casing will preferably be shaped specifically for a given hydrophone sensing element. The hydrophone sensing element may e.g. be a fibre-optic hydrophone sensing element such as a fibre-optic air-back-mandrel hydrophone sensing element or as a fibre-optic pressure-balanced hydrophone according to an aspect of the invention, but may also be an electrical hydrophone sensing element, e.g. a piezo-based hydrophone sensing element.

BRIEF DESCRIPTION OF THE FIGURES

The invention will now be described in more detail with regard to the accompanying figures. The figures show one way of implementing the present invention and is not to be construed as being limiting to other possible embodiments falling within the scope of the attached claim set.

DETAILED DESCRIPTION OF THE INVENTION

Figure 2:
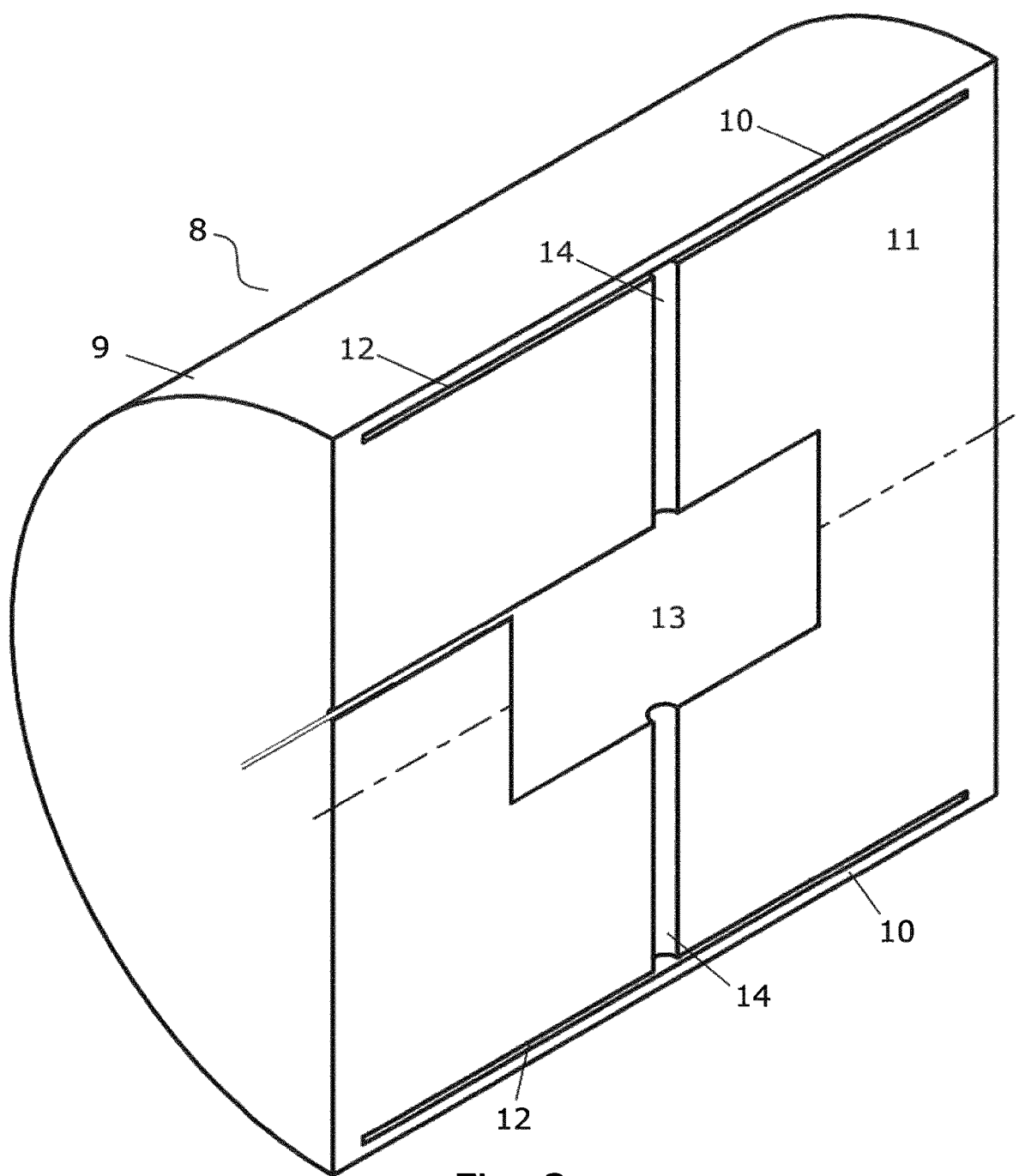
FIG. 2 is a cross-sectional illustration of a hydrophone housing according to an embodiment of the invention.

FIG. 2 illustrates an embodiment of a hydrophone housing 8 according to the invention. The housing comprises an outer casing 9 having an exterior shape suitable for being in close contact with sediment when buried therein. The casing is preferably made in metal, such as stainless steel.

Part of the casing is very thin in order to form a deflectable wall part 10. As previously mentioned, the area ($A_1$) and thickness of the flexible wall part, as well as the material of the casing, are selected to achieve the desired acoustic pressure transfer properties. The interior of the casing is partly filled with a substantially incompressible solid material 11, typically also metal, such as stainless steel. It is important that this material does not absorb pressure energy, as that would devaluate the acoustic pressure transfer to the hydrophone sensing element 1. The solid material is arranged so that it defines at least:
- an outer chamber 12 behind the deflectable wall part;
- a central cavity 13 for holding a hydrophone sensing element 1; and
- a first duct 14 for establishing a narrow liquid connection between the outer chamber and the central cavity.

The casing can be closed, and the outer chamber, the cavity, and the first duct are suitable for holding a liquid in that the casing and the solid material are impervious to liquids.

Figure 3:
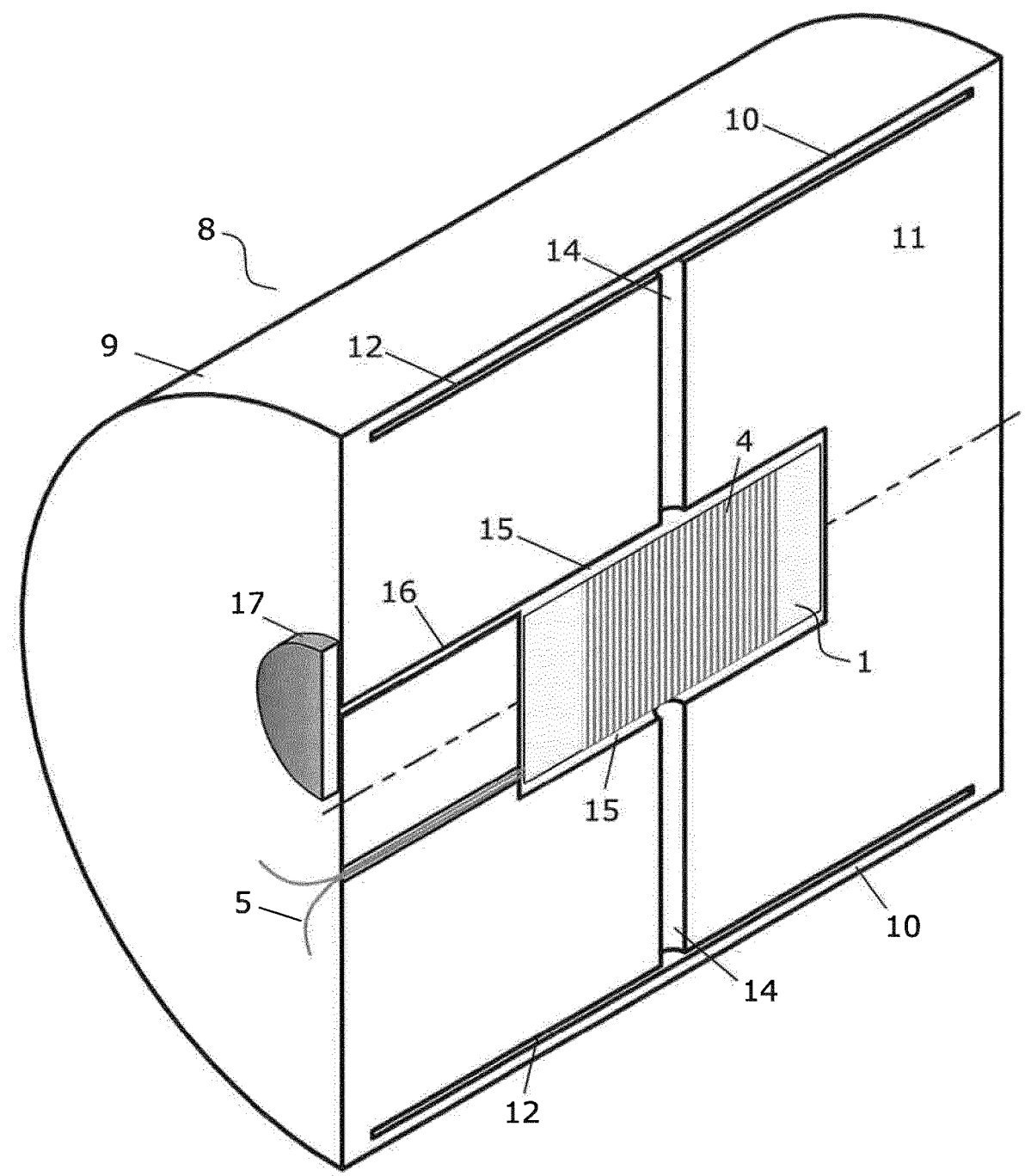
FIG. 3 is a cross-sectional illustration of a hydrophone housing assembly according to an embodiment of the invention.

FIG. 3 illustrates a hydrophone housing assembly comprising the housing 8 of the above embodiment and a hydrophone sensing element 1 held in the cavity 13. The hydrophone sensing element 1 has a surface part 4, and the cavity is shaped so that when the hydrophone sensing element 1 is held therein, an inner chamber 15 is defined in front of at least a sensitive part of the hydrophone sensing element 1.

Since the transmission liquid will typically be more compressible than the solid, it is desirable to minimise the volume of the outer and inner chambers to thereby reduce pressure energy losses in the liquid. Therefore, the cavity is preferably formed to match the shape of the specific type (brand and model) of hydrophone sensing element to be used, so that the inner chamber becomes radially thin and thereby has a small volume. Where the sensitive part only extends over part of the hydrophone sensing element as indicated in FIG. 3, the cavity may be shaped so that the solid material touches or almost touches the non-sensitive parts of the hydrophone sensing element in order to further decrease the volume of the inner chamber. The widths of gaps there between will typically be of the order of 1 mm.

Figure 4:
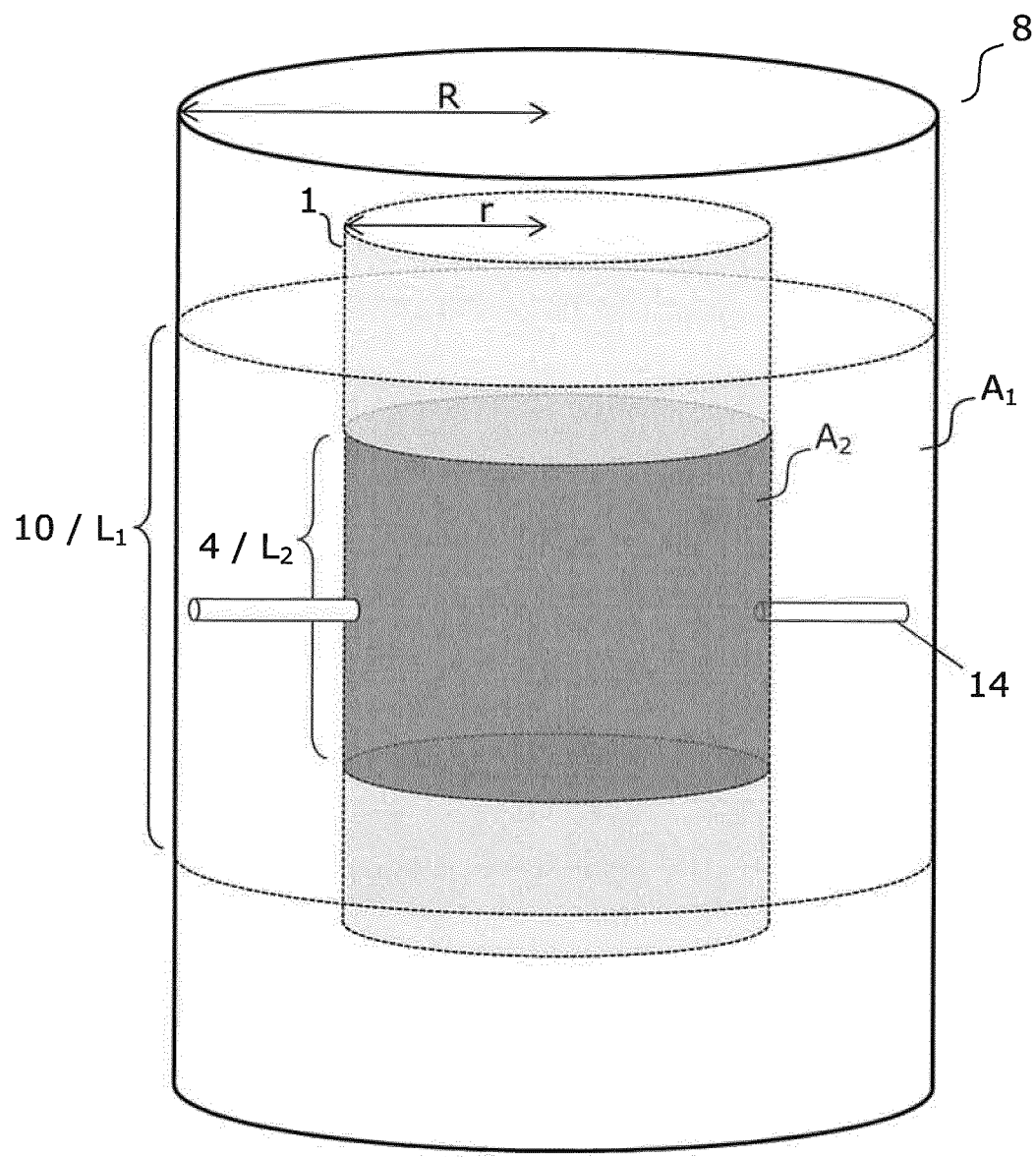
FIG. 4 is a semi-transparent illustration of a hydrophone housing assembly according to an embodiment of the invention.

As previously described, the wall of the outer chamber provided by the deflectable wall part has an area $A_1$, which will typically be more or less equal to the area of the deflectable wall part. Similarly, the wall of the inner chamber provided by the hydrophone sensing element has an area $A_2$. This is easier seen in FIG. 4 which is a semi-transparent illustration of the assembly with housing 8 holding the hydrophone sensing element 1. In order to obtain a high sensitivity, the ratio of $A_1/A_2$ should be as large as practically possible.

In FIG. 3, a second duct 16 for equalizing or balancing static (DC) pressures between the interior of the casing and the surroundings is shown. This second duct can lead into a liquid-filled distensible equalizing chamber 17 positioned outside the casing to compensate for changes in liquid volume.

Figure 1:
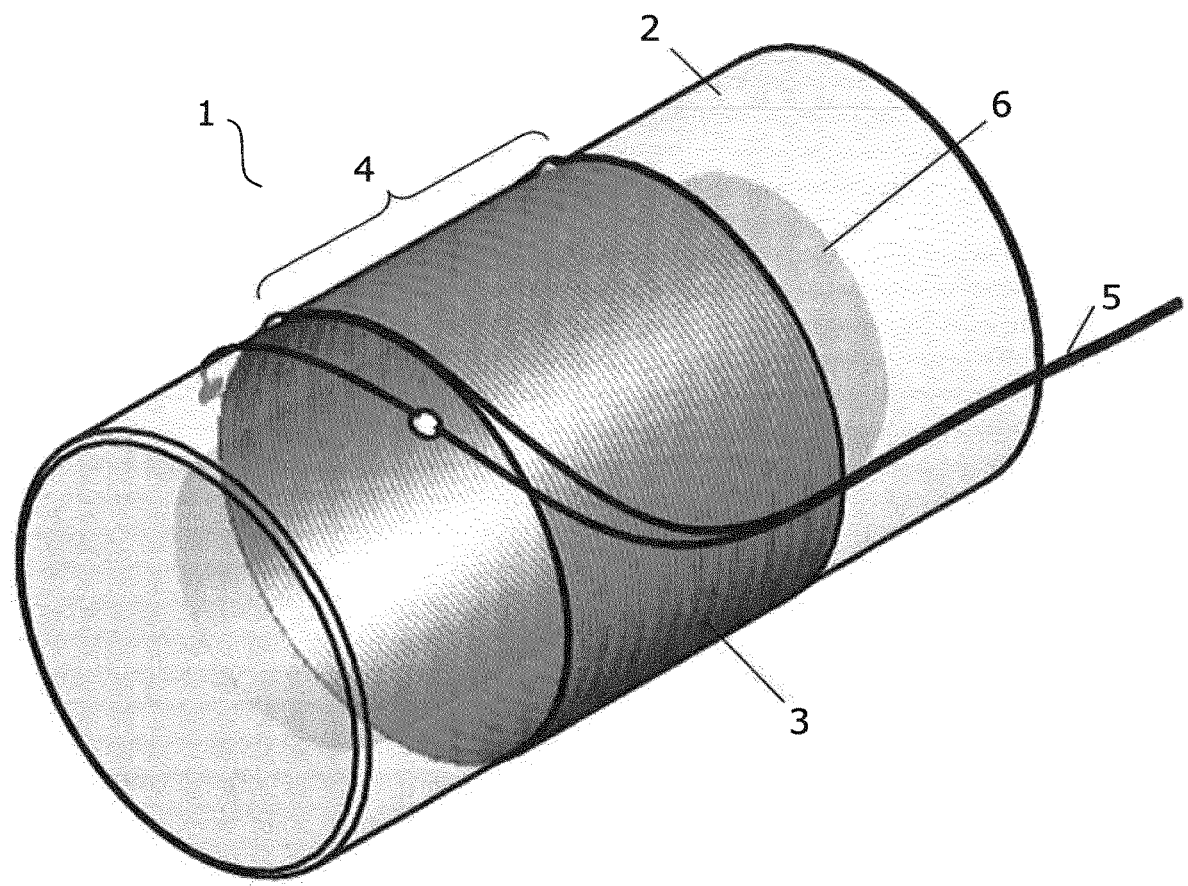
FIG. 1 is a schematic illustration of a fibre-optic air-backed mandrel hydrophone sensing element.

In an embodiment of the hydrophone housing assembly, the hydrophone sensing element is a fibre optic air-backed mandrel hydrophone such as illustrated in FIG. 1 and briefly described previously. Here, the mandrel is typically formed by wrapping the optic fiber outside a thin walled hollow cylinder which is mounted outside a passive inner tube with sufficient clearance to provide air backing. This air gap allows the cylinder supporting the optic fiber to deform in response to incident acoustic waves.

The transmission liquid filling the chambers and ducts of the casing can be selected to have a low compressibility. This is advantageous as it reduces the loss in pressure energy. In a preferred embodiment, the liquid is a silicone fluid.

The overall sensitivity of the hydrophone sensing element in the assembly will increase with
- decreasing thickness of the deflectable wall part 10.
- reducing the liquid volume and/or reducing the compressibility of the transmission liquid, and
- increasing sensitivity of the inner hydrophone sensing element (e.g. by decreasing the wall thickness of a fibre optic mandrel hydrophone sensing element and/or by increasing the backing volume).

Typically, the overall sensitivity of the hydrophone sensing element in the assembly will be less than the direct sensitivity of the hydrophone sensing element.

Figure 5:
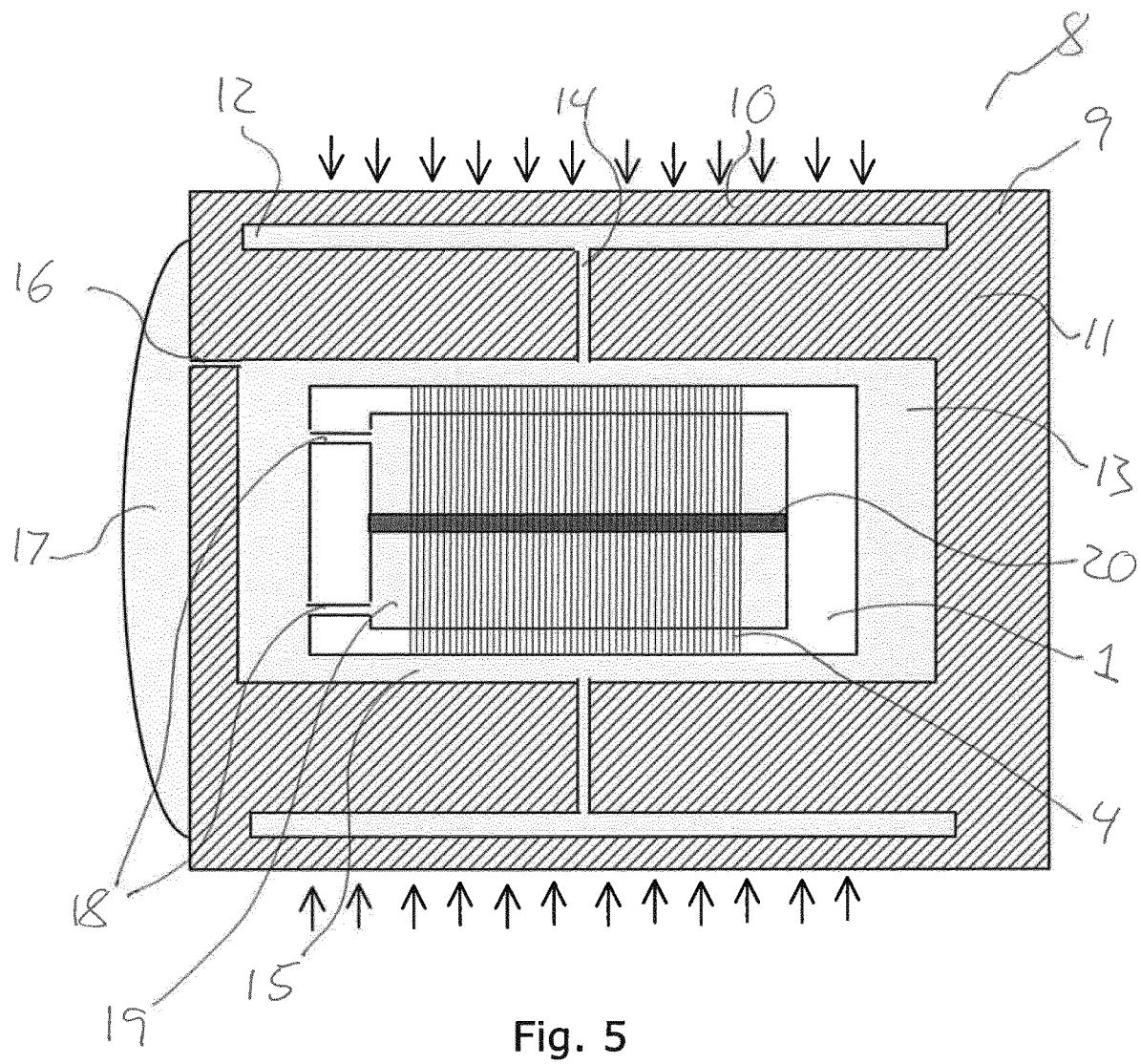
FIG. 5 is a cross-sectional illustration of a hydrophone housing assembly according to an embodiment of the invention.

FIG. 5 illustrates an embodiment of the hydrophone assembly corresponding to the embodiment shown in FIG. 3. Therefore, only the differences between the two embodiments will be presented here. In this embodiment, the hydrophone sensing element 1 is illustrated as a fibre-optic mandrel hydrophone sensing element, but with a liquid backing. Furthermore, the hydrophone sensing element 1 has been pressure balanced such that there is no static pressure difference between the internal volume 19 of the hydrophone sensing element 1 and the inner chamber 15. This is achieved by providing the hydrophone sensing element 1 with a number of internal equalizing ducts 18 (here two are shown, but other numbers may be used). The internal equalizing ducts 18 are configured to act as low-pass filters, e.g. to only allow pressure variations <1 Hz. Thus, the internal equalizing ducts 18 may be constructed in a similar way as the second duct 16, providing pressure balancing of the inner chamber 15. As there is no static pressure difference between the internal volume and the inner chamber, the hydrophone sensing element 1 may be made from a compliant material, such as polycarbonate. Mechanical stability of the hydrophone sensing element 1 is increased by the use of a rigid centre element, here illustrated as a steel bolt 20. To increase the compliance of the hydrophone sensing element 1, the internal volume is made large, relative to the size of the sensing element.

Figure 6:
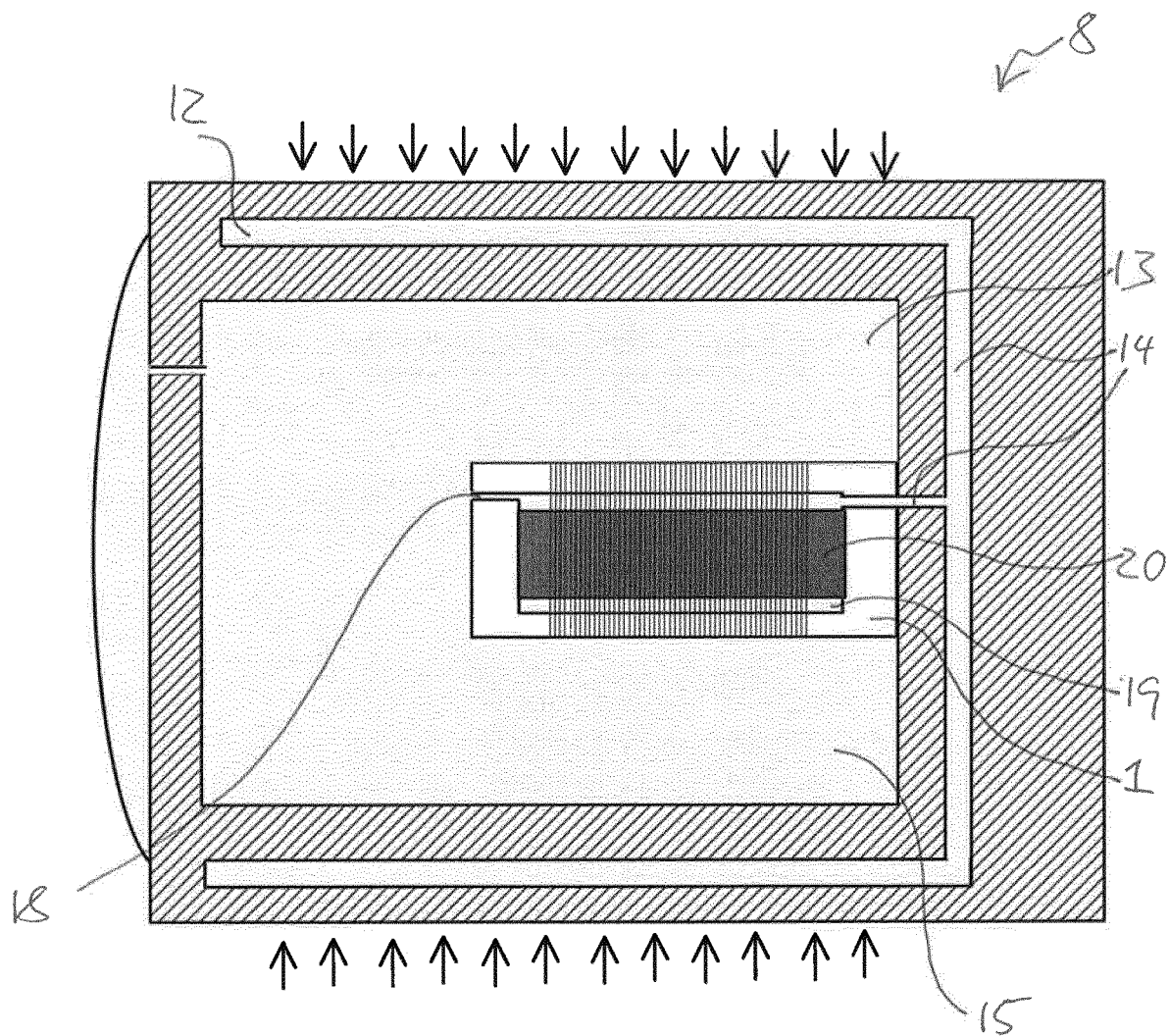
FIG. 6 is a cross-sectional illustration of a hydrophone housing assembly according to an embodiment of the invention.

FIG. 6 illustrates a cross-section of a hydrophone assembly embodiment operating using internal pumping. The embodiment corresponds to the assembly presented in FIG. 5, except that the outer chamber 12 is connected to the internal volume 19 by the first duct 14. In this way, a pressure variation detected by the deflectable wall part will be transmitted and amplified directly into the internal volume 19. The cavity 13 and thus the inner chamber 15 may be made large, compared to the size of the hydrophone sensing element 1, to allow for a greater compliance of the backing volume. In contrast, the internal volume 19 has been minimized, to limit the liquid volume and thus the compressibility thereof, and hence enhance the hydraulic pressure transfer. This is achieved by including a substantially incompressible centre element 20 within the hydrophone sensing element, here in the form of a steel bolt. The centre element 20 further adds mechanical stability to the hydrophone sensing element. The hydrophone sensing element is here illustrated to be pressure balanced with the cavity via the internal equalization duct 18. However, this does not need to be the case for all embodiments using internal pumping. The hydrophone sensing element is here illustrated using the optical configuration of an unbalanced interferometer, e.g. comprising fibre-optic Bragg gratings (FBGs, not shown).

Figure 7:
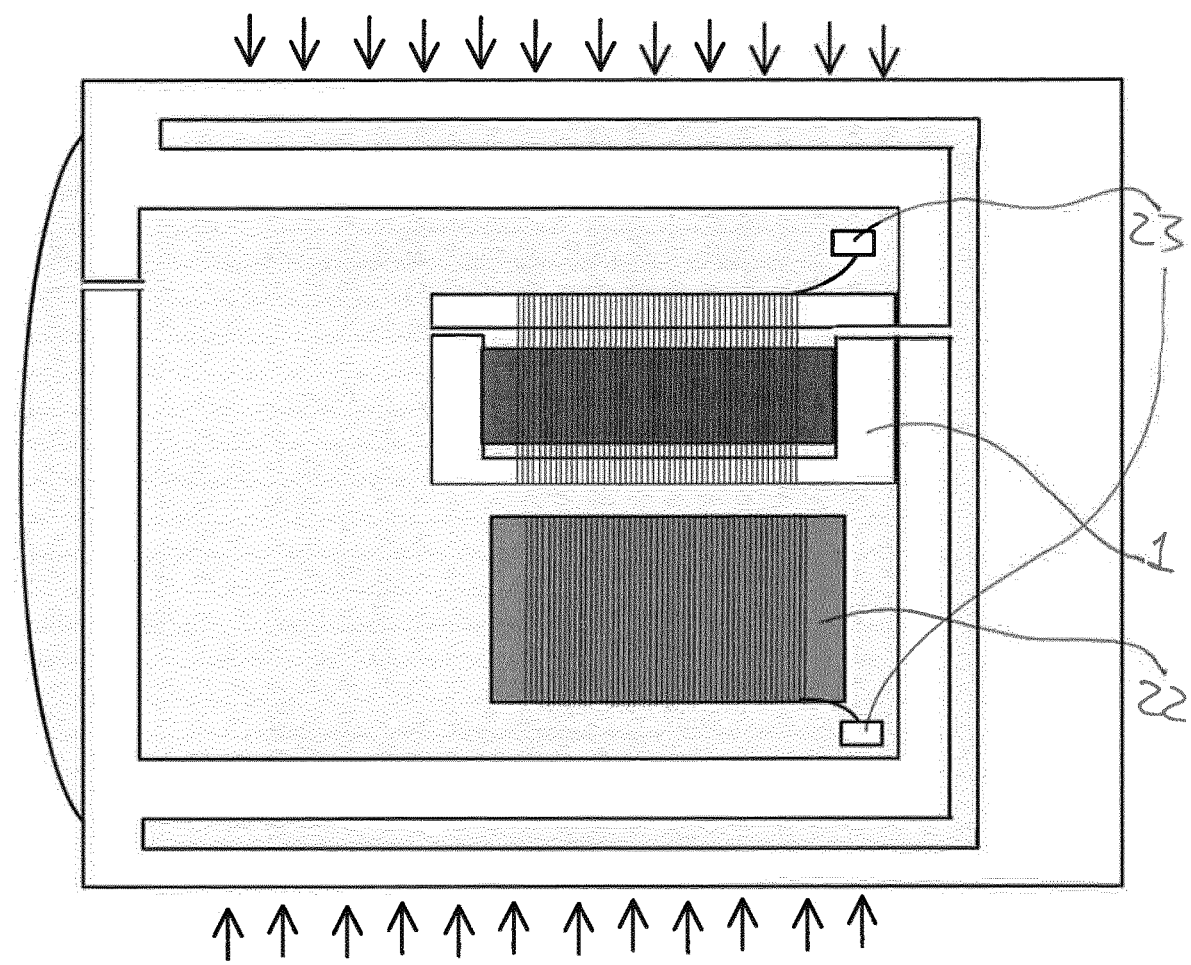
FIG. 7 is a cross-sectional illustration of a hydrophone housing assembly according to an embodiment of the invention.

FIG. 7 shows an embodiment of the hydrophone assembly, corresponding to the one shown in FIG. 6, but using a different optical configuration. In this embodiment, the fibre-optic mandrel hydrophone sensing element 1 is coupled to form one optical arm of a Michelson interferometer, and a reference mandrel 22 is included within the cavity to form the other arm. The two optical arms are terminated with mirrors 23. The reference mandrel 22 is preferably a substantially incompressible mandrel onto which a fibre is wound.

Figure 8:
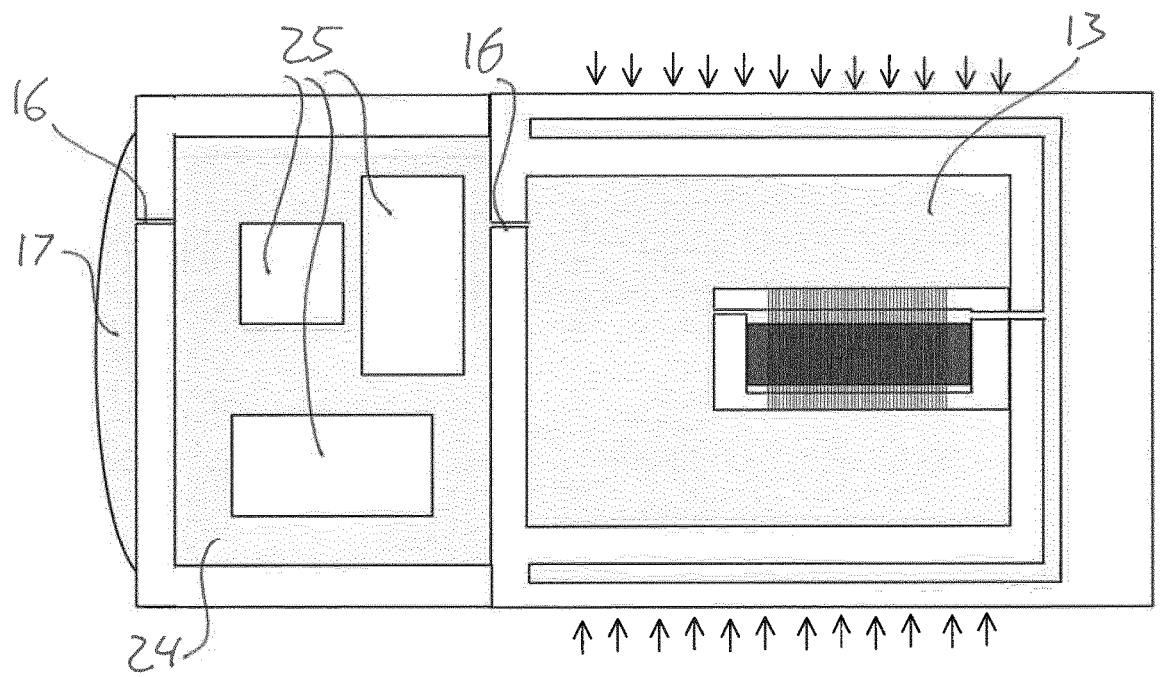
FIG. 8 is a cross-sectional illustration of a hydrophone housing assembly according to an embodiment of the invention.
Figure 9:
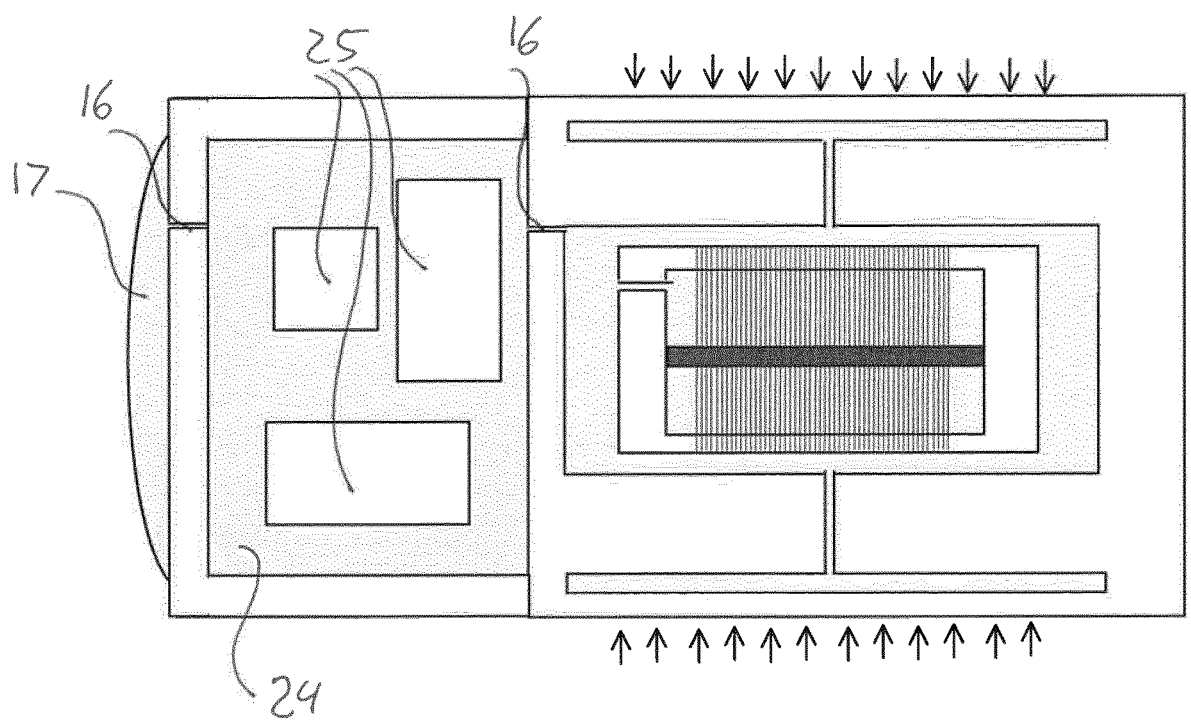
FIG. 9 is a cross-sectional illustration of a hydrophone housing assembly according to an embodiment of the invention.

FIGS. 8 and 9 show embodiments of hydrophone assemblies using internal pumping and external pumping, respectively. The two embodiments further comprise accelerometer chambers 24, here illustrated as containing 3 accelerometers 25. The resulting sensor station is attractive since the whole station may be pressure balanced and thus eliminate the need for pressure sealings, and allow the use of a continuous length of optical fibre through all sensors. The accelerometer chambers 24 are here illustrated to be in liquid communication with the cavity 13 and the distensible equalizing chamber 17, respectively via second ducts 16. Preferably, acoustic pressure variation should not be transmitted into the accelerometer chamber, due to the risk of cross-talk. In the following, a calculation example of how much the strain and the surface in contact with the surrounding sediments is given, using exemplary dimensions of the housing of the present invention. The surface part of the hydrophone sensing element is its cylindrical surface having diameter 26 mm and length: 35 mm for a preferred type of hydrophone sensing element.

Assuming that the strain required in the $j$hydrophone sensing element to obtain a clear signal is $\varepsilon_{sensing\ surface}=0.0001$.

The volume of displacement of the sensing element is:

$$V_{displ.}=A_2 \cdot \Delta r$$

$$V_{displ.}=2\pi \cdot r \cdot L_2 \cdot (\varepsilon_{sensing\ surface} \cdot r)$$

$$V_{displ.}=2\pi \cdot 13\ mm \cdot 35\ mm \cdot (0.0001 \cdot 13\ mm)$$

$$V_{displ.}=3.7165\ mm^3$$

If we add the housing with the hydraulic amplifier the pressure waves are picked up at the much larger surface of the deflectable wall part of the casing having, for example, diameter 66 mm and length 50 mm.

Assuming for simplicity reasons that the transmission liquid is completely incompressible, the volume of displacement at the hydrophone sensing element will be identical to the volume of displacement at the deflectable wall part which is the new contact surface to the surrounding sediment. The corresponding displacement of this larger surface is:

$$V_{displ.}=A_1 \cdot \Delta R$$

$$\Delta R=V_{displ.}/A_1$$

$$\Delta R=3.7165\ mm^3/(2\pi \cdot 33\ mm \cdot 50\ mm)$$

$$\Delta R=0.000358\ mm$$

The strain at this new contact surface is:

$$\varepsilon_{contact\ surface}=\Delta R/R$$

$$\varepsilon_{contact\ surface}=0.000358\ mm/33\ mm$$

$$\varepsilon_{contact\ surface}=0.000011$$

The strain or stress reduction obtained by using the housing according to the invention is then:

$$f=\varepsilon_{contact\ surface}/\varepsilon_{sensing\ surface}$$

$$f=0.000011/0.0001$$

$$f=0.11$$

Thus, the use of the housing with the hydraulic amplifier reduces the stress in the surrounding material by a factor of 9.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A hydrophone housing configured to house a hydrophone sensing element, the hydrophone housing comprising:
    a casing with an exterior shape having a deflectable wall part;
    incompressible solid material partly filling an interior of the casing to define:
        an outer chamber adjacent to the deflectable wall part;
        a cavity configured to hold a hydrophone sensing element, the cavity defining an inner chamber to immediately surround at least a sensitive part of the hydrophone sensing element, wherein the hydrophone sensing element is configured to sense a pressure variation between an internal volume and an external volume, the internal volume being internal to the hydrophone sensing element and the external volume being the volume of the inner chamber;
    a first duct configured to establish a liquid connection between the outer chamber and the internal volume;
    wherein a wall of the outer chamber provided by the deflectable wall part has a total area, $A_1$, larger than a total area, $A_2$, of a wall of the inner chamber; and
    wherein in a closed situation of the casing, the outer chamber, the cavity, and the first duct are configured to hold a liquid in the casing and the solid material is impermeable to the liquid.

2. The hydrophone housing of claim 1, wherein the first duct is dimensioned to act as a mechanical, acoustic low-pass filter.

3. The hydrophone housing of claim 2, wherein the first duct is dimensioned to have a cut-off frequency of at least 200 Hz.

4. The hydrophone housing of claim 1, further comprising:
a second duct configured to establish a liquid connection between the interior and the exterior of the casing and being dimensioned to act as a mechanical, acoustic low-pass filter with a cut-off frequency of 1 Hz or less.

5. The hydrophone housing of claim 4, further comprising:
a distensible equalizing chamber configured to compensate for changes in liquid volume of liquid in the interior of the casing by being filled with the same liquid as the interior of the casing and being connected to the interior of the casing by the second duct.

6. The hydrophone housing of claim 1, wherein the casing has an overall cylindrical exterior shape with the deflectable wall part being arranged in a central band thereof.

7. The hydrophone housing of claim 1, comprising two or more first ducts arranged radially between the cavity for holding the hydrophone sensing element and the outer chamber.

8. The hydrophone housing of claim 1, comprising an accelerometer chamber configured to house at least a first accelerometer, the hydrophone housing further comprising a connection duct for establishing a liquid connection between the accelerometer chamber and at least one of the inner chamber, the outer chamber, or the first duct.

9. A hydrophone assembly, comprising:
a hydrophone sensing element; and
a hydrophone housing configured to house the hydrophone sensing element, the hydrophone housing comprising:
a casing with an exterior shape having a deflectable wall part;
incompressible solid material partly filling an interior of the casing to define:
an outer chamber adjacent to the deflectable wall part;
a cavity configured to hold a hydrophone sensing element, the cavity defining an inner chamber to immediately surround at least a sensitive part of the hydrophone sensing element, wherein the hydrophone sensing element is configured to sense a pressure variation between an internal volume and an external volume, the internal volume being internal to the hydrophone sensing element and the external volume being the volume of the inner chamber;
a first duct configured to establish a liquid connection between the outer chamber and the internal volume;
wherein a wall of the outer chamber provided by the deflectable wall part has a total area, $A_1$, larger than a total area, $A_2$, of a wall of the inner chamber;
wherein in a closed situation of the casing, the outer chamber, the cavity, and the first duct are configured to hold a liquid in the casing and the solid material is impermeable to the liquid; and
wherein the hydrophone sensing element is held in the cavity of the hydrophone housing.

10. The hydrophone assembly of claim 9, wherein the hydrophone sensing element is a fibre optic mandrel hydrophone.

11. The hydrophone assembly of claim 9, wherein the hydrophone sensing element further comprises:
an internal equalizing duct configured to establish a liquid connection between the internal volume of the hydrophone sensing element and the inner chamber of the hydrophone housing and being dimensioned to act as a mechanical, acoustic low-pass filter with a cut-off frequency of 1 Hz or less.

12. The hydrophone assembly of claim 9, wherein at least the outer and inner chambers and the first duct are configured to be filled by a transmission liquid.

13. The hydrophone assembly of claim 12, wherein the transmission liquid is a silicone fluid.

* * * * *